(12) United States Patent
Gordon

(10) Patent No.: US 10,946,896 B2
(45) Date of Patent: Mar. 16, 2021

(54) OFF-ROAD FRONT SUSPENSION SYSTEM

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 112 days.

(21) Appl. No.: 15/933,212

(22) Filed: Mar. 22, 2018

(65) Prior Publication Data
US 2018/0281853 A1  Oct. 4, 2018

Related U.S. Application Data

(60) Provisional application No. 62/480,960, filed on Apr. 3, 2017.

(51) Int. Cl.
*B62D 7/22* (2006.01)
*B60G 7/00* (2006.01)
(Continued)

(52) U.S. Cl.
CPC ............... *B62D 7/22* (2013.01); *B60B 3/16* (2013.01); *B60B 27/0052* (2013.01); *B60B 35/128* (2013.01); *B60G 3/14* (2013.01); *B60G 3/20* (2013.01); *B60G 7/001* (2013.01); *B60G 7/005* (2013.01); *B60G 7/008* (2013.01); *B60G 7/02* (2013.01); *B60G 15/063* (2013.01); *B60K 17/16* (2013.01); *B60K 17/306* (2013.01); *B60R 19/54* (2013.01); *B62D 3/02* (2013.01);
(Continued)

(58) Field of Classification Search
CPC ... B62D 7/22; B62D 7/18; B62D 7/20; B60G 7/001; B60G 7/02; B60G 7/008; B60G 7/005; B60G 15/063; B60G 3/20; B60G 2300/07; B60G 2200/144; B60G 2200/156; B60G 2202/312; B60G 2204/129; B60G 2204/148; B60G 2204/416; B60G 2206/12; B60G 2206/11; B60G 2206/50; B60K 17/306
See application file for complete search history.

(56) References Cited

U.S. PATENT DOCUMENTS 2,766,079 A    10/1956  Browne
4,761,019 A *   8/1988  Dubensky ............... B60G 7/001
                                               280/124.136
(Continued)

OTHER PUBLICATIONS

International Search Report, PCT Application No. PCT/US2018/025759, dated Jul. 5, 2018.

*Primary Examiner* — Ruth Ilan
*Assistant Examiner* — Joselynn Y Sliteris
(74) *Attorney, Agent, or Firm* — Rutan & Tucker LLP; Hani Z. Sayed

(57) ABSTRACT

A suspension is provided for coupling a front wheel with a chassis of an off-road vehicle. The suspension comprises upper and lower suspension arms that each includes two inboard mounting points to the chassis and one outboard rod-end joint to a spindle assembly coupled with the front wheel. A ball comprising each outboard rod-end joint is fastened by way of a bolt between a pair of parallel prongs extending from the spindle assembly. The upper suspension arm is configured to facilitate coupling a strut between the lower suspension arm and the chassis. A steering rod is coupled with the spindle assembly by way of a steering rod-end joint that is disposed forward of a drive axle, thereby decreasing leverage of the front wheel on the steering rod and substantially eliminating bump steer that may occur due to rough terrain.

20 Claims, 4 Drawing Sheets

(51) Int. Cl.

| | | |
|---|---|---|
| *B60G 7/02* | (2006.01) | |
| *B60G 15/06* | (2006.01) | |
| *B62D 7/20* | (2006.01) | |
| *B60K 17/30* | (2006.01) | |
| *B60G 3/20* | (2006.01) | |
| *B62D 7/18* | (2006.01) | |
| *B62D 7/16* | (2006.01) | |
| *F16C 7/02* | (2006.01) | |
| *B62D 25/08* | (2006.01) | |
| *B62D 65/04* | (2006.01) | |
| *B62D 63/02* | (2006.01) | |
| *F16C 11/06* | (2006.01) | |
| *B60B 3/16* | (2006.01) | |
| *B60B 27/00* | (2006.01) | |
| *B60B 35/12* | (2006.01) | |
| *B60G 3/14* | (2006.01) | |
| *F16D 3/30* | (2006.01) | |
| *B60K 17/16* | (2006.01) | |
| *B60R 19/54* | (2006.01) | |
| *B62D 3/02* | (2006.01) | |
| *B62D 21/11* | (2006.01) | |
| *B62D 21/12* | (2006.01) | |
| *B62D 23/00* | (2006.01) | |
| *B62D 27/02* | (2006.01) | |
| *F16D 1/10* | (2006.01) | |

(52) U.S. Cl.
CPC ............. *B62D 7/16* (2013.01); *B62D 7/166* (2013.01); *B62D 7/18* (2013.01); *B62D 7/20* (2013.01); *B62D 21/11* (2013.01); *B62D 21/12* (2013.01); *B62D 23/005* (2013.01); *B62D 25/08* (2013.01); *B62D 27/023* (2013.01); *B62D 63/025* (2013.01); *B62D 65/04* (2013.01); *F16C 7/02* (2013.01); *F16C 11/0695* (2013.01); *F16D 3/30* (2013.01); *B60G 2200/14* (2013.01); *B60G 2200/144* (2013.01); *B60G 2200/156* (2013.01); *B60G 2200/44* (2013.01); *B60G 2202/312* (2013.01); *B60G 2204/129* (2013.01); *B60G 2204/143* (2013.01); *B60G 2204/148* (2013.01); *B60G 2204/416* (2013.01); *B60G 2206/11* (2013.01); *B60G 2206/12* (2013.01); *B60G 2206/50* (2013.01); *B60G 2206/72* (2013.01); *B60G 2206/73* (2013.01); *B60G 2206/84* (2013.01); *B60G 2300/07* (2013.01); *F16C 2326/24* (2013.01); *F16D 2001/103* (2013.01)

(56) References Cited

U.S. PATENT DOCUMENTS

| | | | | |
|---|---|---|---|---|
| 4,840,396 | A * | 6/1989 | Kubo | B60G 3/202 |
| | | | | 280/124.143 |
| 4,998,748 | A * | 3/1991 | Kashiwagi | B60G 3/26 |
| | | | | 280/124.144 |
| 5,292,149 | A * | 3/1994 | Luger | B60G 3/26 |
| | | | | 280/5.521 |
| 6,386,553 | B2 * | 5/2002 | Zetterstrom | B60G 3/20 |
| | | | | 180/413 |
| 8,444,160 | B2 * | 5/2013 | Okamoto | B60G 3/20 |
| | | | | 280/124.135 |
| 8,678,409 | B2 * | 3/2014 | Koide | B60G 7/008 |
| | | | | 280/124.135 |
| 9,061,564 | B1 * | 6/2015 | Yu | B60G 21/05 |
| 9,895,949 | B2 * | 2/2018 | Lu | B60G 3/20 |
| 2005/0146111 | A1 | 7/2005 | Yamazaki | |
| 2005/0258614 | A1 | 11/2005 | Dove | |
| 2010/0210367 | A1 | 8/2010 | Mondragon-Parra | |
| 2012/0313425 | A1 | 12/2012 | Siebeneick | |
| 2016/0039260 | A1 | 2/2016 | Randle | |
| 2019/0111746 | A1 * | 4/2019 | Yamazaki | B60G 3/22 |
| 2019/0375260 | A1 * | 12/2019 | Bakker | B62D 7/18 |
| 2020/0148021 | A1 * | 5/2020 | Koff | B60G 3/20 |

* cited by examiner

OFF-ROAD FRONT SUSPENSION SYSTEM

PRIORITY

This application claims the benefit of and priority to U.S. Provisional Application, entitled "Off-Road Front Suspension System," filed on Apr. 3, 2017 and having application Ser. No. 62/480,960.

FIELD

The field of the present disclosure generally relates to vehicle suspension systems. More particularly, the field of the invention relates to an off-road front suspension system configured to improve the mechanical strength and performance of off-road drivetrains.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A suspension is provided for coupling a front wheel with a chassis of an off-road vehicle. The suspension comprises an upper suspension arm that includes two inboard mounting points to the chassis and one outboard rod-end joint to a spindle assembly coupled with the front wheel. A lower suspension arm comprises two inboard mounting points to the chassis and one outboard rod-end joint to the spindle assembly. Each outboard rod-end joint includes a ball that is rotatable within a casing that is threadably coupled with each of the upper and lower suspension arms. A bolt fastens each of the balls between a pair of parallel prongs extending from the spindle assembly, such that the upper and lower suspension arms may pivot with respect to the spindle assembly during vertical motion of the spindle assembly, as well as during horizontal rotation of the spindle assembly due to steering. A strut comprising a shock absorber and a coil spring is coupled between the lower suspension arm and the chassis. The upper suspension arm is configured to facilitate coupling the strut between the lower suspension arm and the chassis. A steering rod is coupled with the spindle assembly by way of a steering rod-end joint that is disposed at a front of the spindle assembly. The steering rod-end joint includes a ball that is rotatable within a casing that is threadably coupled with the steering rod. A pair of parallel prongs and a bolt hingedly couple the steering rod-end with the spindle assembly, such that the steering rod-end joint allows vertical and horizontal rotational motion of the spindle assembly during operation of the off-road vehicle. The steering rod-end joint is coupled with the spindle assembly forward of a drive axle, thereby decreasing leverage of the front wheel on the steering rod and substantially eliminating bump steer that may occur due to rough terrain.

In an exemplary embodiment, a suspension for coupling a front wheel with a chassis of an off-road vehicle comprises: an upper suspension arm comprising two inboard mounting points to the chassis and one outboard rod-end joint to a spindle assembly coupled with the front wheel; a lower suspension arm comprising two inboard mounting points to the chassis and one outboard rod-end joint to the spindle assembly; a strut comprising a shock absorber and a coil spring that are coupled between the lower suspension arm and the chassis; and a steering rod that is coupled with the spindle assembly by way of a steering rod-end joint disposed at a front of the spindle assembly.

In another exemplary embodiment, the strut is mounted to the lower suspension arm by way of a lower pivot, and an upper pivot couples a top of the strut to the chassis. In another exemplary embodiment, the strut is configured to control vertical articulation of the front suspension system due to movement of the front wheel in response to terrain. In another exemplary embodiment, the upper suspension arm may be suitably configured to facilitate coupling the strut between the lower suspension arm and the chassis. In another exemplary embodiment, the upper suspension arm is configured in the form of a J-arm.

In another exemplary embodiment, a drive axle including a constant velocity (CV) joint is coupled between a transaxle and the front wheel, the drive axle being configured to conduct torque from the transaxle to the front wheel, the CV joint being configured to allow uninterrupted torque transmission from the transaxle to the front wheel during vertical pivoting of the upper suspension arm and the lower suspension arm due to road conditions. In another exemplary embodiment, each of the outboard rod-end joints includes a ball that is rotatable within a casing that is threadably coupled with each of the upper suspension arm and the lower suspension arm. In another exemplary embodiment, a bolt fastens the ball between a pair of parallel prongs that extend from the spindle assembly, a recess being disposed between the pair of parallel prongs and having a shape and a size that are suitable to fixedly receive the ball and allow a desired degree of movement of the casing on the ball. In another exemplary embodiment, each of the balls is configured to rotate within its respective casing, such that the upper suspension arm and the lower suspension arm may pivot with respect to the spindle assembly during vertical motion of the spindle assembly, and such that the spindle assembly may undergo horizontal rotation with respect to the upper suspension arm and the lower suspension arm during steering. In another exemplary embodiment, the pair of parallel prongs and the bolt are configured to provide a two-shear joint that may withstand twice the incident force than may be withstood by a single-shear joint.

In another exemplary embodiment, the steering rod-end joint includes a ball that is rotatable within a casing that is threadably coupled with the steering rod. In another exemplary embodiment, a pair of parallel prongs and a bolt hingedly couple the steering rod-end with the spindle assembly, such that the steering rod-end joint allows vertical and horizontal rotational motion of the spindle assembly during operation of the off-road vehicle. In another exemplary embodiment, the steering rod-end joint is coupled with the spindle assembly forward of a drive axle, thereby providing a front steering system that advantageously decreases leverage of the front wheel on the steering rod and substantially eliminates bump steer that may occur due to rough terrain.

In an exemplary embodiment, a suspension for coupling a front wheel with a chassis of an off-road vehicle comprises: an upper suspension arm coupled to a spindle assembly by an outboard rod-end joint and coupled to the chassis by at least one or more inboard mounting points; a lower suspension arm coupled to the spindle assembly by an outboard rod-end joint and coupled to the chassis by at least one or more inboard mounting points; a strut coupled between the lower suspension arm and the chassis; and a steering rod coupled to a front of the spindle assembly by a steering rod-end joint.

In another exemplary embodiment, the strut includes a shock absorber and a coil spring that are configured to dampen vertical motion between the chassis and the front wheel in response to terrain. In another exemplary embodiment, the spindle assembly includes one or more roller bearings that support at least a constant velocity joint and the front wheel such that uninterrupted torque may be transmitted from a transaxle to the front wheel during vertical and horizontal movement of the spindle assembly with respect to the chassis.

In another exemplary embodiment, the outboard rod-end joint includes a ball mounted within a clevis comprising the spindle assembly and rotatably disposed within a casing that is coupled with a suspension arm. In another exemplary embodiment, the clevis comprises parallel prongs extending from the spindle assembly and a bolt disposed across the parallel prongs, such that the ball may be fixated on the bolt between the parallel prongs. In another exemplary embodiment, the parallel prongs are configured such that a recess between the parallel prongs has a shape and size that are suitable to receive the ball and allow a desired degree of movement of the casing on the ball. In another exemplary embodiment, the clevis is configured to support the ball so as to provide a two-shear joint.

BRIEF DESCRIPTION OF THE DRAWINGS

The drawings refer to embodiments of the present disclosure in which.

Figure 1:
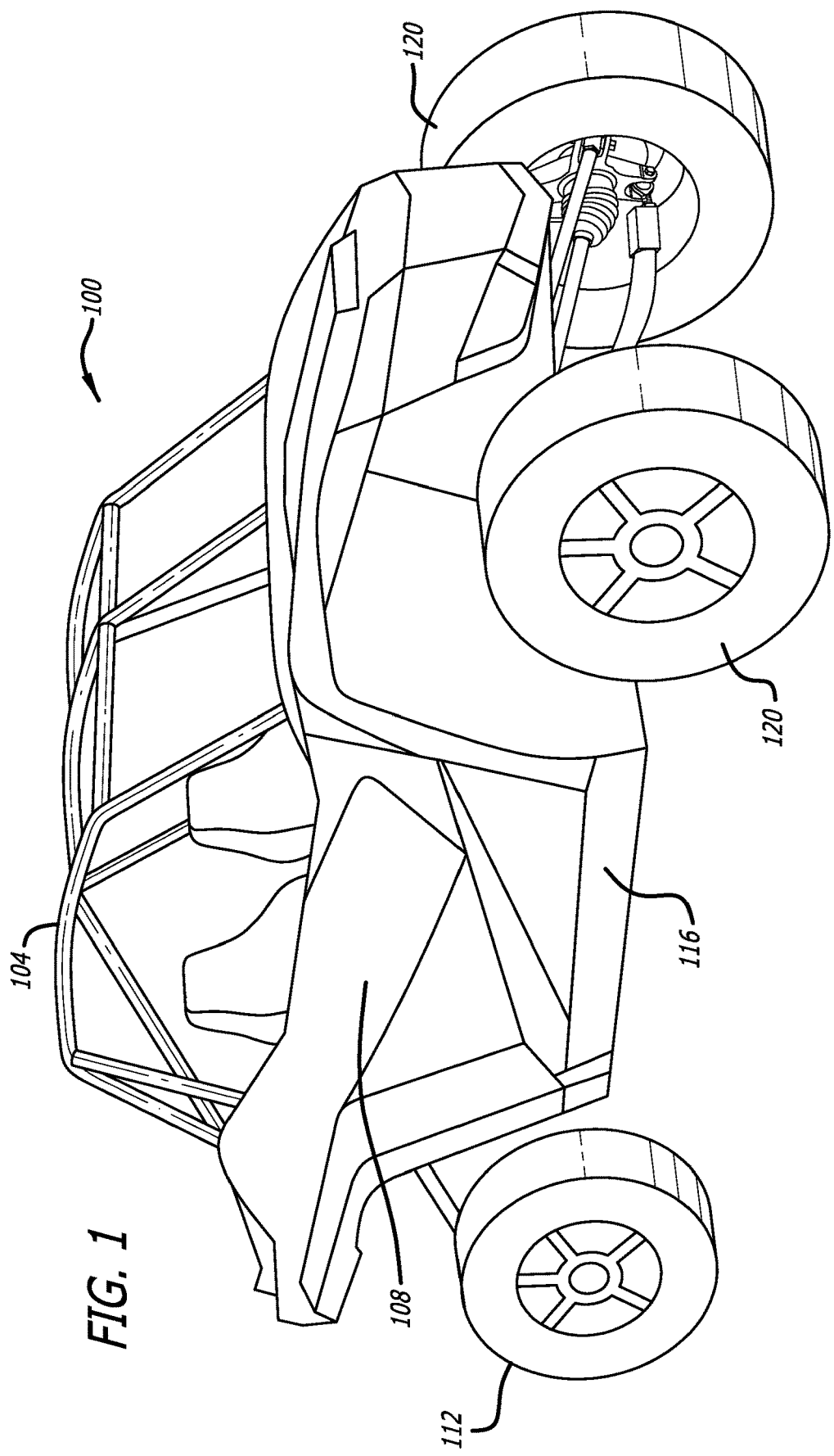
FIG. 1 illustrates an exemplary embodiment of an off-road vehicle that is particularly suitable for implementation of an off-road front suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a suspension for coupling a front wheel with a chassis of an off-road vehicle. The suspension comprises an upper suspension arm that includes two inboard mounting points to the chassis and one outboard rod-end joint to a spindle assembly coupled with the front wheel. A lower suspension arm comprises two inboard mounting points to the chassis and one outboard rod-end joint to the spindle assembly. Each outboard rod-end joint is comprised of a ball that is rotatable within a casing that is threadably coupled with each of the upper and lower suspension arms. A bolt fastens each of the balls between a pair of parallel prongs extending from the spindle assembly, such that the upper and lower suspension arms may pivot with respect to the spindle assembly during vertical motion of the spindle assembly, as well as during horizontal rotation of the spindle assembly due to steering. A strut comprising a shock absorber and a coil spring is coupled between the lower suspension arm and the chassis. The upper suspension arm is configured to facilitate coupling the strut between the lower suspension arm and the chassis. A steering rod is coupled with the spindle assembly by way of a steering rod-end joint that is disposed at a front of the spindle assembly. The steering rod-end joint is comprised of a ball that is rotatable within a casing that is threadably coupled with the steering rod. A pair of parallel prongs and a bolt hingedly couple the steering rod-end with the spindle assembly, such that the steering rod-end joint allows vertical and horizontal rotational motion of the spindle assembly during operation of the off-road vehicle. The steering rod-end joint is coupled with the spindle assembly forward of a drive axle, thereby decreasing leverage of the front wheel on the steering rod and substantially eliminating bump steer that may occur due to rough terrain.

FIG. 1 shows an off-road vehicle 100 that is particularly suitable for implementation of an off-road front suspension system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system disclosed herein. It should be understood, however, that the front suspension system of the present disclosure is not to be limited to the off-road vehicle 100, but rather the front suspension system may be incorporated into a wide variety of off-road vehicles, other than UTVs, without limitation.

Figure 2:
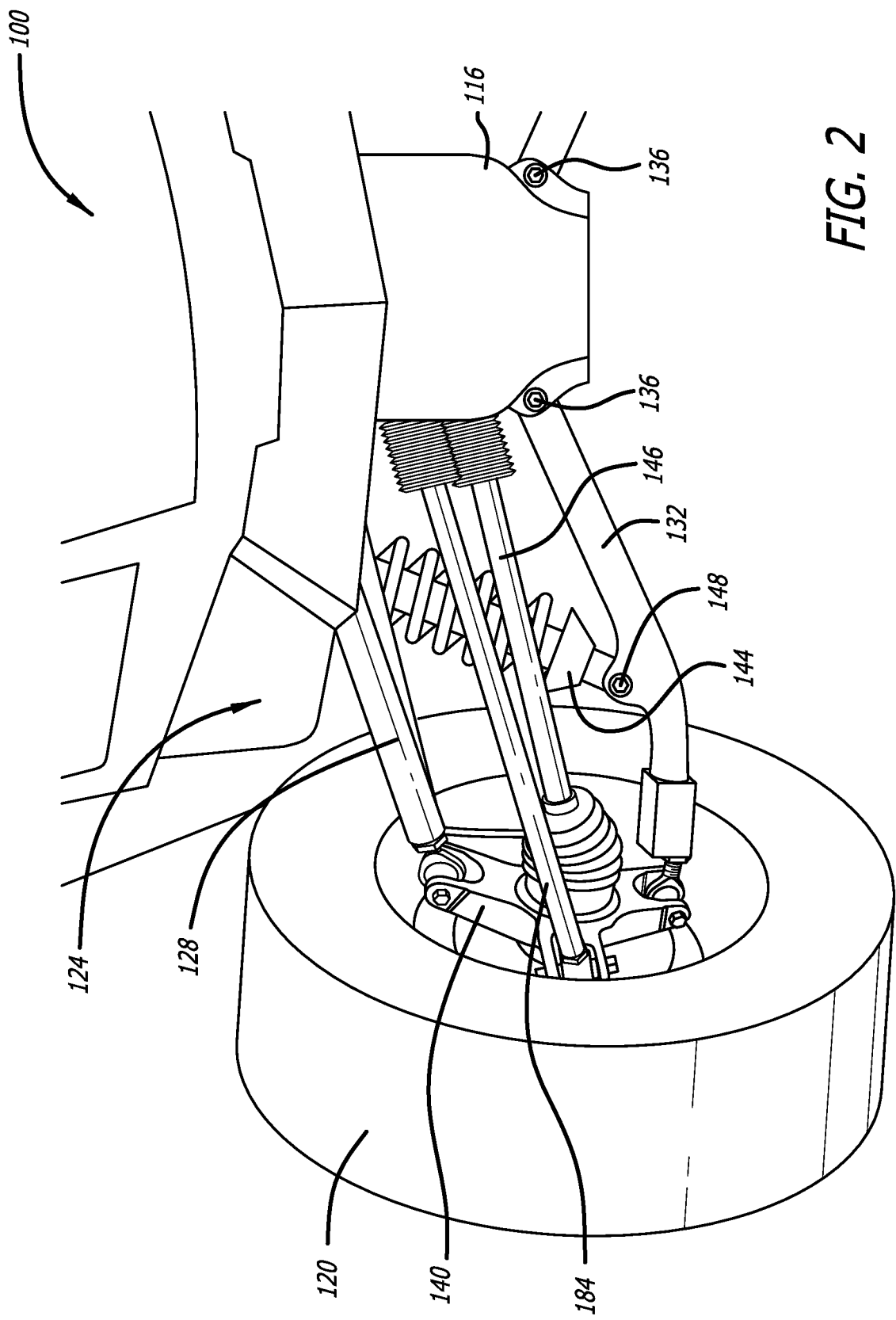
FIG. 2 illustrates a front view of a front suspension system that is configured to couple a front wheel with a passenger side of an off-road vehicle.

FIG. 2 illustrates a front view of a front suspension system 124 that is configured to couple the front wheel 120 with a passenger side of the off-road vehicle 100. The front suspension system 124 is comprised of an upper suspension arm 128 and a lower suspension arm 132 that couple the front wheel 120 with the chassis 116. Each of the upper and lower suspension arms 128, 132 comprises two inboard mounting points 136 to the chassis 116 and one outboard mounting joint to a spindle assembly 140. As will be recognized, the upper and lower suspension arms 128, 132 generally are of a double wishbone variety of suspension that facilitates controlling various parameters affecting the orientation of the wheel 120 with respect to the off-road vehicle 100, such as, by way of non-limiting example, camber angle, caster angle, toe pattern, roll center height, scrub radius, and scuff.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantially identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100.

As shown in FIG. 2, a strut 144 that is comprised of a shock absorber and a coil spring is mounted to the lower suspension arm 132 by way of a lower pivot 148. An upper pivot (not shown) couples a top of the strut 144 to the chassis 116. The strut 144 is configured to control vertical articulation of the front suspension system 124 due to movement of the front wheel 120 as the off-road vehicle 100 travels over bumpy terrain. The upper suspension arm 128 may be suitably configured, such as in the form of a J-arm, so as to facilitate coupling the strut 144 between the lower suspension arm 132 and the chassis 116 in lieu of being coupled between the upper suspension arm and the chassis.

In some embodiments, coupling the strut 144 with the lower suspension arm 132 positions the strut at between 8 inches and 10 inches lower, with respect to the chassis 116, than the position of the strut when coupled with the upper suspension arm 128. Experimental observation has shown that the lower position of the strut 144 generally facilitates a lower center of gravity of the off-road vehicle 100 and a relatively smaller shock angle, as well as eliminating a need for extending the strut towers through and above a hood of the off-road vehicle 100. In one embodiment, the coupling of the strut 144 with the lower suspension arm 132 positions the strut at substantially 90-degrees with respect to the lower pivot 148 and the upper pivot during full compression of the strut.

Figure 3:
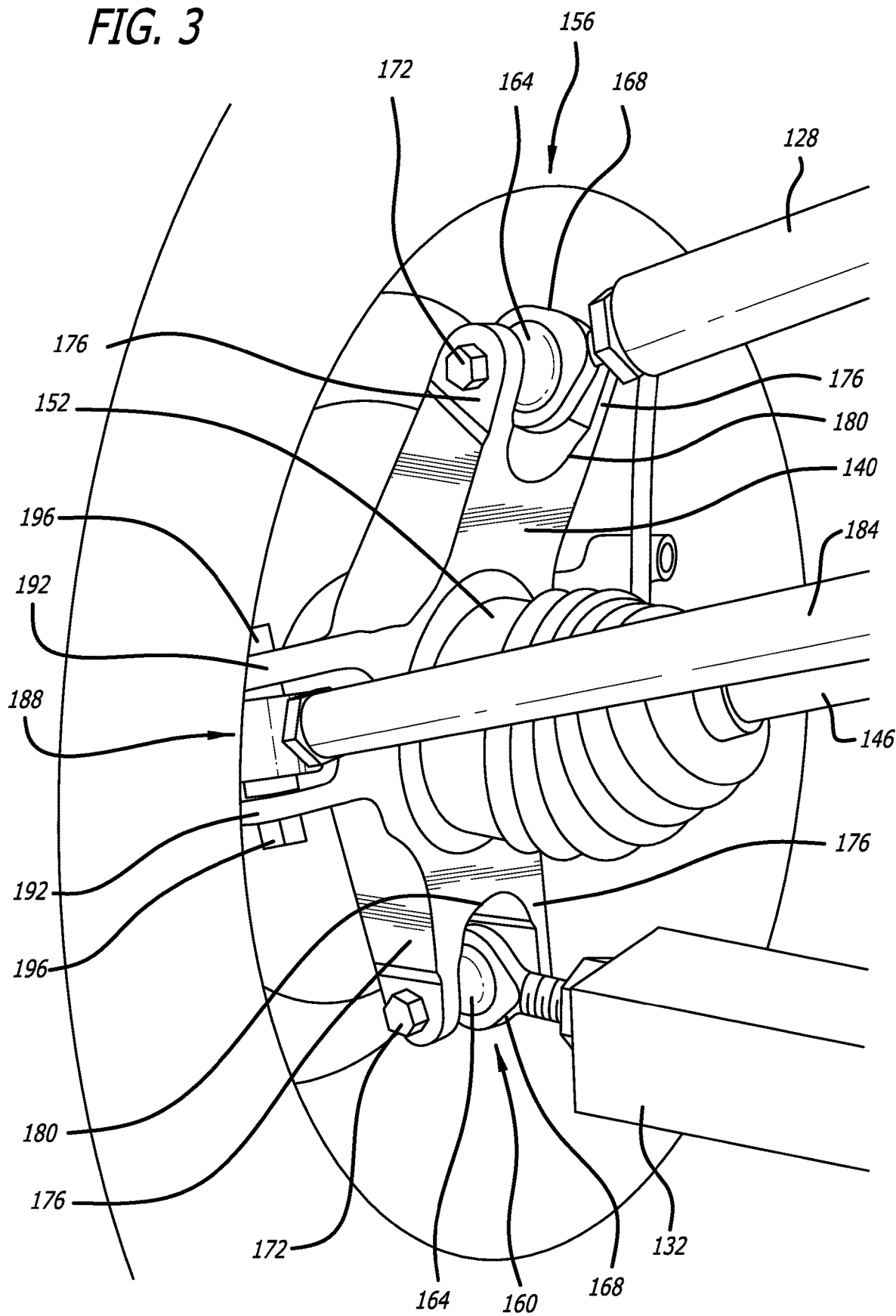
FIG. 3 illustrates a front view of an exemplary embodiment of outboard rod-end joints coupling a spindle assembly with upper and lower suspension arms.
Figure 3A:
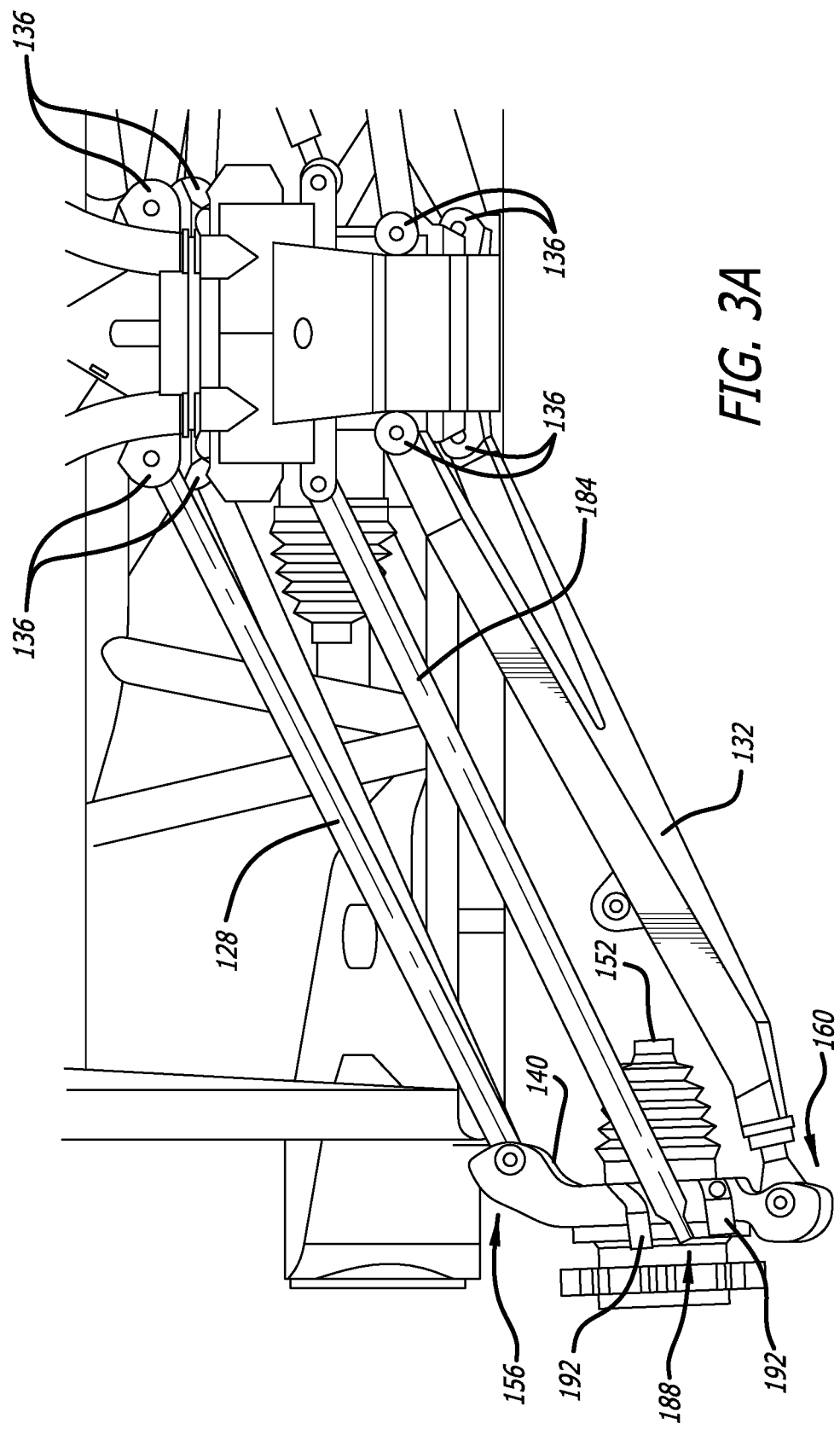
FIG. 3A illustrates an alternative front view of the exemplary embodiment of FIG. 3 depicting upper and lower suspension arms attached to outboard rod-end joints and inbound mounting points to the chassis.

As shown in FIG. 2, a drive axle 146 is coupled between a transaxle and the front wheel 120. The drive axle 146 is configured to conduct torque from the transaxle to the front wheel 120 and accommodate vertical pivoting motion of the front suspension assembly 124 in response to road conditions. As best shown in FIG. 3, the drive axle 146 is comprised of a constant velocity (CV) joint 152 that is coupled with the spindle assembly 140 onto which the front week is mounted. The CV joint 152 allows uninterrupted torque transmission from the transaxle to the front wheel 120 during vertical pivoting of the front suspension assembly 124 due to road conditions. As will be appreciated, the spindle assembly 140 generally supports the CV joint 152 and the front wheel 120 by way of one or more roller bearings (not shown).

As further shown in FIG. 3, the spindle assembly 140 is pivotally coupled with the upper and lower suspension arms 128, 132. An upper rod-end joint 156 couples the upper suspension arm 128 to the spindle assembly 140, and a lower rod-end joint 160 couples the lower suspension arm 132 to the spindle assembly. Preferably, the upper and lower rod-end joints 156, 160 are of a Heim joint variety, wherein each of the joints is comprised of a ball 164 that is movable within a casing 168 that is threadably coupled with each of the suspension arms 128, 132. A bolt 172 fastens each of the balls 164 between a pair of parallel prongs 176 extending from the spindle assembly 140. It is contemplated that a recess 180 disposed between each pair of parallel prongs 176 has a shape and a size that are suitable to fixedly receive the ball 164 and allow for a desired degree of movement of the casing 168 on the ball. Thus, during vertical motion of the spindle assembly 140, as well as during horizontal rotation of the spindle assembly 140 due to steering, the balls 164 rotate within their respective casings 168, allowing the upper and lower suspension arms 128, 132 to pivot with respect to the spindle assembly 140.

Upon inspection of FIG. 3, it will be recognized that the upper and lower rod-end joints 156, 160 are similar to Clevis fasteners. For example, each pair of parallel prongs 176 is similar to a Clevis, the bolt 172 is similar to a Clevis pin, and the ball 164 and casing 168 are similar to a tang. As such, each of the upper and lower rod-end points 156, 160 provides two shear planes that may withstand twice the incident force that may be withstood by single shear joints that are used in conventional front suspensions.

In the embodiment illustrated in FIG. 3, a steering rod 184 couples the spindle assembly 140 with a steering system of the off-road vehicle 100. The steering rod 184 is coupled with the spindle assembly 140 by way of a rod-end joint 188 that is similar to the upper and lower rod-end joints 156, 160. It is contemplated, therefore, that the rod-end joint 188 may be of the Heim joint variety or may be of a bushing variety, as desired. A pair of parallel prongs 192 and a bolt 196 hingedly couple the steering rod 184 with the spindle assembly 140. As will be appreciated, the rod-end joint 188 allows vertical and horizontal rotational motion of the spindle assembly 140 during operation of the off-road vehicle 100. Further, the rod-end joint 188 is coupled with the spindle assembly 140 forward of the drive axle 146, thereby providing a front steering system to the off-road vehicle 100. Experimentation has demonstrated that the front steering system shown in FIG. 3 advantageously decreases leverage of the front wheel 120 on the rod-end joint 188 and the steering rod 184, thereby substantially eliminating bump steer that may occur due to forces exerted on the front wheel by rough terrain.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A suspension for coupling a front wheel with a chassis of an off-road vehicle, comprising:
    a spindle assembly coupled with a front wheel comprising:
        a first set of parallel prongs disposed at a of the spindle assembly;
        a second set of parallel prongs disposed at a bottom of the spindle assembly;
        a third set of parallel prongs disposed at a front of the spindle assembly; and
        a hole disposed between the first and second sets of parallel prongs configured to couple with a constant velocity (cv) joint;
    an upper suspension arm comprising two inboard mounting points coupled to the chassis and one outboard rod-end joint coupled to the spindle assembly via the first set of parallel prongs;
    a lower suspension arm comprising two inboard mounting points coupled to the chassis and one outboard rod-end joint coupled to the spindle assembly via the second set of parallel prongs;
    a strut comprising a shock absorber and a coil spring that are coupled between the lower suspension arm and the chassis; and
    a steering rod that is coupled with the spindle assembly via the third set of parallel prongs by way of a steering rod-end joint.

2. The suspension of claim 1, wherein the strut is mounted to the lower suspension arm by way of a lower pivot.

3. The suspension of claim 2, wherein the strut is configured to control vertical articulation of the front suspension due to movement of the front wheel in response to terrain.

4. The suspension of claim 1, wherein the upper suspension arm may be suitably configured to facilitate coupling the strut between the lower suspension arm and the chassis.

5. The suspension of claim 4, wherein the upper suspension arm is configured in the form of a J-arm.

6. The suspension of claim 1, wherein a drive axle including a constant velocity (CV) joint is coupled with the front wheel, the drive axle being configured to conduct torque to the front wheel, the CV joint being configured to allow uninterrupted torque transmission to the front wheel during vertical pivoting of the upper suspension arm and the lower suspension arm due to road conditions.

7. The suspension of claim 1, wherein each of the outboard rod-end joints includes a ball that is rotatable within a casing that is threadably coupled with each of the upper suspension arm and the lower suspension arm.

8. The suspension of claim 7, wherein a bolt fastens each ball between respective pair of parallel prongs that extend from the spindle assembly, a recess being disposed between each pair of parallel prongs and having a shape and a size that are suitable to fixedly receive the ball and allow a desired degree of movement of the casing on the ball.

9. The suspension of claim 8, wherein each of the balls is configured to rotate within respective casing, such that the upper suspension arm and the lower suspension arm may pivot with respect to the spindle assembly during vertical motion of the spindle assembly, and such that the spindle assembly may undergo horizontal rotation with respect to the upper suspension arm and the lower suspension arm during steering.

10. The suspension of claim 8, wherein the pairs of parallel prongs and respective bolts are configured to provide a two-shear joint that may withstand twice the incident force than may be withstood by a single-shear joint.

11. The suspension of claim 1, wherein the steering rod-end joint includes a ball that is rotatable within a casing that is threadably coupled with the steering rod.

12. The suspension of claim 11, wherein the third pair of parallel prongs and a bolt hingedly couple the steering rod-end joint with the spindle assembly, such that the steering rod-end joint allows vertical and horizontal rotational motion of the spindle assembly during operation of the off-road vehicle.

13. The suspension of claim 11, wherein the steering rod-end joint is coupled with the spindle assembly forward of a drive axle, thereby providing a front steering system that advantageously decreases leverage of the front wheel on the steering rod and substantially eliminates bump steer that may occur due to rough terrain.

14. A suspension for coupling a front wheel with a chassis of an off-road vehicle, the suspension comprising:
- a spindle assembly coupled with a front wheel comprising:
  - a first set of parallel prongs disposed at a top of the spindle assembly;
  - a second set of parallel prongs disposed at a bottom of the spindle assembly;
  - a third set of parallel prongs disposed at a front of the spindle assembly; and
  - a hole disposed between the first and second sets of parallel prongs configured to couple with a constant velocity (cv) joint;
- an upper suspension arm coupled to the spindle assembly via the first set of parallel prongs by an outboard rod-end joint and coupled to the chassis by at least one or more inboard mounting points;
- a lower suspension arm coupled to the spindle assembly via the second set of parallel prongs by an outboard rod-end joint and coupled to the chassis by at least one or more inboard mounting points;
- a strut coupled between the lower suspension arm and the chassis; and
- a steering rod coupled to the spindle assembly via the third set of parallel prongs by a steering rod-end joint.

15. The suspension of claim 14, wherein the strut includes a shock absorber and a coil spring that are configured to dampen vertical motion between the chassis and the front wheel in response to terrain.

16. The suspension of claim 14, wherein the spindle assembly includes one or more roller bearings that support at least a constant velocity joint and the front wheel such that uninterrupted torque may be transmitted to the front wheel during vertical and horizontal movement of the spindle assembly with respect to the chassis.

17. The suspension of claim 14, wherein at least one outboard rod-end joint includes a ball mounted within a clevis comprising the spindle assembly and rotatably disposed within a casing that is coupled with a suspension arm.

18. The suspension of claim 17, wherein the clevis comprises the one or more sets of parallel prongs extending from the spindle assembly and a bolt disposed across the parallel prongs, such that the ball may be fixated on the bolt between the parallel prongs.

19. The suspension of claim 18, wherein the one or more sets of parallel prongs are configured such that a recess between the parallel prongs has a shape and size that are suitable to receive the ball and allow a desired degree of movement of the casing on the ball.

20. The suspension of claim 17, wherein the clevis is configured to support the ball so as to provide a two-shear joint.

* * * * *